J. S. BRANYAN & A. M. RUNG.
FISHING REEL.
APPLICATION FILED MAY 17, 1916.
1,230,270.
Patented June 19, 1917.
3 SHEETS—SHEET 2.
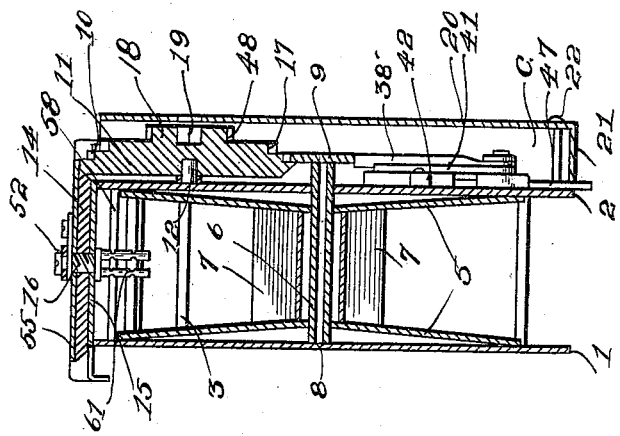
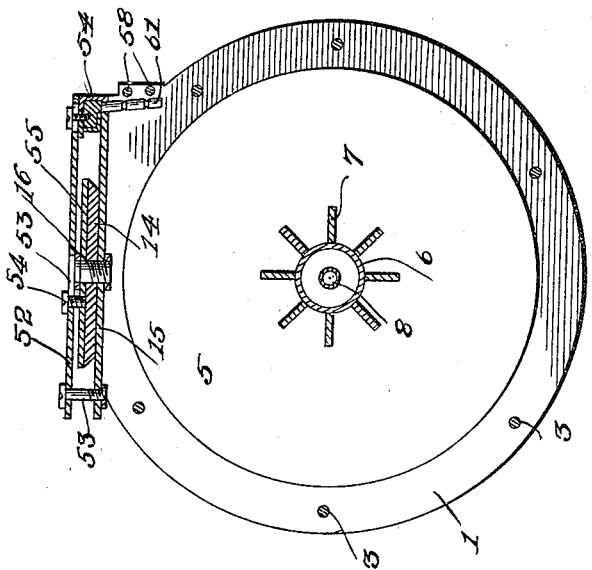
John S. Branyan
Albert M Rung
Inventor
By Geo. P. Kimmel
Attorney J. S. BRANYAN & A. M. RUNG.
FISHING REEL.
APPLICATION FILED MAY 17, 1916.
1,230,270.
Patented June 19, 1917.
3 SHEETS—SHEET 3.
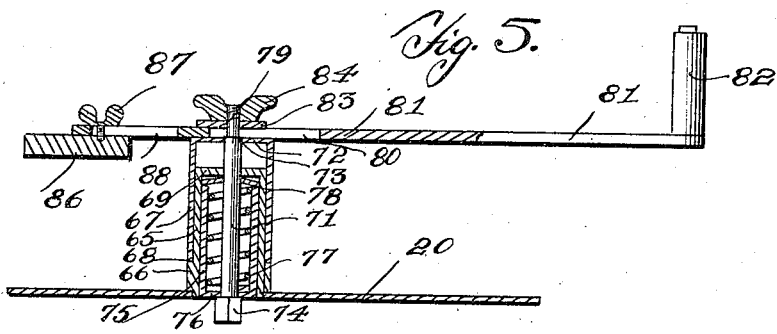
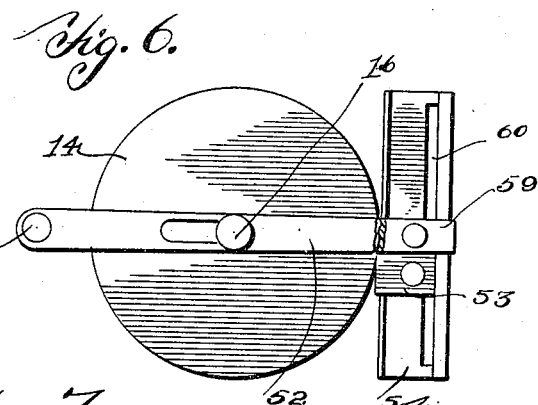
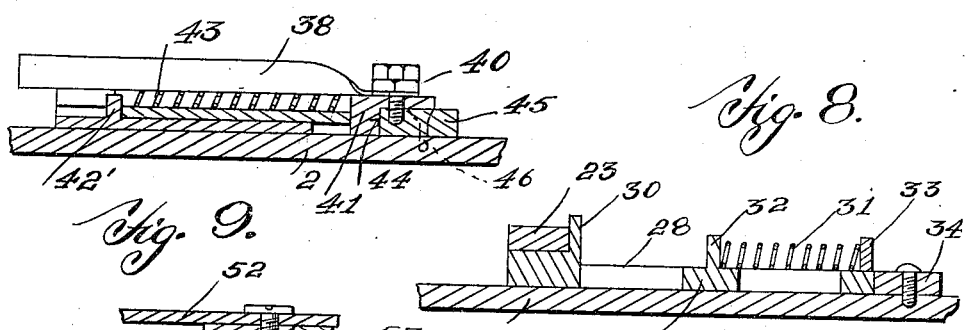
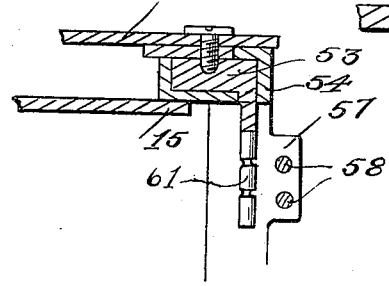
John S. Branyan
Albert M. Rung.
Inventor
By Geo. P. Kimmel
Attorney

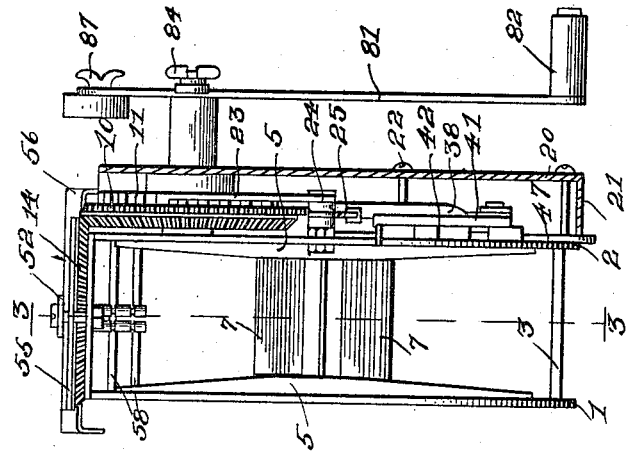

UNITED STATES PATENT OFFICE.

JOHN S. BRANYAN AND ALBERT M. RUNG, OF HARRISBURG, PENNSYLVANIA.

FISHING-REEL.

1,230,270.  Specification of Letters Patent.  Patented June 19, 1917.

Application filed May 17, 1916. Serial No. 98,027.

*To all whom it may concern:*

Be it known that we, JOHN S. BRANYAN and ALBERT M. RUNG, citizens of the United States, and residents of Harrisburg, in the county of Dauphin and State of Pennsylvania, have invented certain new and useful Improvements in Fishing-Reels, of which the following is a specification.

The present invention relates to new and useful improvements in fishing reels and has for its primary object the provision of a reel of this character adapted for disposition on a fishing rod or the like and provided with a new and improved winding mechanism tending to cheapen the manufacture of such devices and to enhance their efficiency.

Another object of our invention is to provide a device of the character described, having improved guiding means for the fishing line or the like to be wound upon the reel, said guiding means automatically distributing the fishing line evenly upon said reel.

A further object of our invention is to provide new and improved brake means associated with the reel for locking the same in a desired position.

A further object of our invention is to provide improved means for retarding the movement of the reel, said retarding means permitting the reel to turn but preventing spinning when paying out the line.

A still further object of our invention is to provide an improved handle or crank for use in connection with our fishing reel.

Other objects and advantages to be derived from the use of our improved fishing reel will appear from the following detail description and the claims, taken with an inspection of the accompanying drawings, in which:

Figure 1 is a side elevational view of a fishing reel embodying the improvements of our invention, the housing being removed;

Fig. 2 is an end elevational view of the same, showing the housing and operating crank in position thereon;

Fig. 3 is a vertical longitudinal sectional view taken on the line 3—3 of Fig. 2 looking in the direction of the arrows;

Fig. 4 is a transverse vertical sectional view taken on the line 4—4 of Fig. 1 looking in the direction of the arrows;

Fig. 5 is an enlarged detached vertical sectional view of the crank mechanism;

Fig. 6 is an enlarged top plan view of the line guiding mechanism;

Fig. 7 is a longitudinal sectional view of the warning mechanism of our invention;

Fig. 8 is a similar view of the operating mechanism for the locking brake of my invention; and Fig. 9 is a fragmental sectional view of the line distributing element.

Referring more particularly to the drawings, wherein similar characters of reference designate like and corresponding parts throughout the various views, 1 and 2 designate the side portions of the frame of our improved reel. The side portions 1 and 2 are connected by brace rods 3 of which there are a plurality arranged adjacent the peripheries of said side portions. The side portions 1 and 2 are disk-like members, and carry at a suitable point on their peripheries, the brackets 4 arranged for attachment of the reel to a fishing pole or the like.

The reel or winding drum is composed of side portions 5 connected to a hub portion 6 which is tubular, a plurality of radiating wings 7 carried between said side portions 5 and on said hub 6 serving to receive the fishing line or the like to be wound upon said reel. The hub portion 6 is journaled upon a transversely extending shaft 8 and rotatable therewith.

Carried by the free ends of the shaft 8 we provide a pinion 9 meshing with the gear portion 10 of a wheel 11, said wheel 11 being mounted on a trunnion 12 carried by the side portion 2 of the main frame. The wheel 11 is provided with a beveled gear surface 13 for meshing engagement with a similarly formed gear 14 carried by a platform portion 15 on a journal 16 for a purpose which will hereinafter appear.

The wheel 11 is also provided with a ratchet toothed portion 17 adapted to be engaged by a stop pawl in a manner which will hereinafter appear for positively preventing rotation of the wheel. A friction brake is also associated with the wheel 11 and will be described in detail hereinafter, said wheel 11 being provided with a hub extension 18 for engagement with a brake band and brake mechanism hereinafter described. The outer face of the hub 18 is provided with a rectangular opening or recess 19 for a purpose which will hereinafter appear.

A casing C houses the alarm mechanism, which in the present instance, is a clicker described in detail hereinafter, positive and frictional brake members, and the gearing, said housing having a front face 20 and a peripheral wall 21, said face and wall being secured to the side portion 2 by means of screws 22 or the like.

The locking brake of our invention includes a tooth engaging arm 23 pivotally mounted on a trunnion 24 extending from the side portions 2 of the frame, said arm having integrally formed therewith a laterally extending arm 25, the free end of the latter engaging the coil spring 26, said spring being engaged at its free end with an abutment 27 carried by and integrally formed with the side portions 2. We provide means for moving the arm 23 out of engagement with the teeth 17, the latter normally being engaged by said arm by virtue of the spring 26. Said actuating means includes a crosshead 28 slidably mounted on an extension 29 carried by the portions 2 and having a pin 30 on the free end thereof for engagement with said arm 23. A coil spring 31 is interposed between an extension 32 carried by the block 29 and an extension 33 is formed on the rear end of the crosshead 28. A manipulating cam 34 pivoted at 35 on the side portion 2 is provided for engagement with a crosshead enlargement 33, said cam having an operating lever 36 extending therefrom. The cam 34 is provided with two surfaces designated 37 arranged relatively at right-angles and it will, therefore, be seen that when the arm 36 is moved to the dotted line position shown in Fig. 1, one face of the cam will be removed from engagement with the crosshead and the other face presented thereto, this causing movement of the crosshead 28 to be imparted to the arm 23 forcing the latter out of engagement with the teeth 17.

The warning device of our invention, in the present instance, is in the form of a "clicker" the same being shown best in Figs. 1 and 7. In the present instance we provide a spring arm of flat metal designated 38 twisted at 39 and fastened at 40 to a crosshead 41, the latter being mounted in guides 42. The twist 39 formed in the spring arm 38 presents the free end of said arm in a vertical plane to the pinion 9 hereinbefore described, said spring arm engaging with the teeth of said pinion as the same rotates causing a clicking sound, thereby warning the operator that the line is running out. It is of course, desirable that the arm 38 be capable of movement into and out of engagement with the pinion 9, therefor, we provide an abutment 42 mounted between the arms of the crosshead 41, a coil spring 43 being interposed between the crosshead 41 and said abutment whereby to maintain the crosshead in a position remote from said pinion 9. The rear end of the crosshead is undercut as at 44 to receive a cam 45 rotatable upon a trunnion 46 and having a manipulating lever 47. The cam 45 is provided with two faces similarly to the cam 34 thereby causing, upon movement of the lever 47, the spring arm 38 to be engaged and disengaged as the case may be with said pinion 9.

The friction brake mechanism of our invention includes a band 48 of suitable material circumferentially embracing the hub 18 of the wheel 11. The free end of the band 48 designated 49 is connected with an operating mechanism 50 having an operating lever 51, said mechanism 50 being identical in construction with the mechanism for operating the clicker hereinbefore described. Of course, it is to be understood that suitable openings are to be provided in the wall 21 of the casing C for accommodating the levers 36, 47 and 51.

The line guide of our invention includes the bevel gear 14, an operating arm 52, the latter being pivotally mounted on a screw 53 carried by the support 15. The arm 52 extends forwardly over the gear 14 and is provided with a slot 53 for reception of a wrist-pin 54 carried by a protecting plate 55 associated with said gear. It will thus be seen that when the gear is rotated the arm 52 will be oscillated upon its pivot 53. The free end of the arm 52 is connected pivotally and slidably with a crosshead 54 mounted in a transversely arranged guide 55, said guide being formed integrally with the supporting member 15. The free ends of the member 15 are downwardly bent as at 56 for engagement with the casing C, the latter serving to support and strengthen the same. The downwardly bent portions 56 are provided with outwardly extending portions 57 serving to support laterally extending guide rollers 58 arranged in spaced relation thereon. An extension 59 carried by the crosshead 54 projects through a slot 60 formed in said guide 55, said extension serving to carry grooved anti-friction guiding rollers 61 between which a fishing line or the like is adapted to be operated. The line is of course trained between the laterally extending rollers 58 and the same coöperates with the rollers 61. We shall term the rollers 59 guiding rollers and the rollers 61 distributing rollers in view of their respective functions. It will be seen that when the fishing line or the like is inserted between the sets of rollers 58 and 61 and the reel rotated the fishing line will be wound evenly thereupon, the rollers 61, by virtue of their lateral movement, serving to distribute the fishing line over the reel.

We provide new and improved crank mechanism for our improved reel the same being shown to advantage in Fig. 5. In Fig. 5 the outer wall 20 of the casing C is shown, said extension being provided with a lug 66 for a purpose which will hereinafter appear. A slidable casing 67 provided with a recess 68, engageable at times with the lug 66, surrounds the tubular extension 65. The extension 65 is provided with an end 69 having an opening 70 through which the shaft 71 passes, a casing 67 being similarly provided with an end 72 formed with an opening 73 through which the outer free end of said shaft projects. The inner end of the shaft is provided with a squared portion 74 for engagement with the squared recess 19 formed in the wheel 11, hereinbefore described.

An inner tubular member 75 provided with a closed end 76 engaged by the squared enlargement 74 of the shaft 71 surrounds said shaft. A coil spring 77 is wound about said shaft and arranged within said casing 75. The outer end of the coil spring engaging a washer 78 carried in the tubular extension 65 hereinbefore described. The outer free end of the shaft 71 is provided with a squared portion 79 engaging through a slot 80 formed in a crank 81, said crank having a handle 82 on one free end thereof.

A gripping washer 83 having a squared opening is receivable over the squared end 79 of the shaft 71 and a wing nut 84 is receivable on the threaded portion 85 of said shaft. A counter-balance 86 is carried by one free end of said crank arm 81, a wing nut 87 engaging through a slot 88 in said crank arm serves to maintain said counter-balance in adjusted position. It will be seen that when it is desired to disengage the squared portion 74 of the shaft from the wheel 11 an outward pull is directed on the shaft, this movement causing the inner tubular member 75 to compress the spring 77 against the washer 78. By turning the casing 67 when in the outermost position the inner marginal edge thereof will be engaged with the lug 66 maintaining the shaft in the outermost position and thereby out of engagement with said wheel 11.

It will be seen that in the provision of our improved reel it is possible to control a fishing line whereby to exert any desired control over said line, that is, it is possible to lock the line against movement if desired; it is possible to permit retarded movement of the line, and by maintaining the "clicker" in operative engagement with the pinion 9 it is possible for the operator to be warned of a disturbance at the end of the line. The provision of the balanced crank provides against the uneven operating of the device.

It will also be apparent that by throwing the crank out of engagement with the wheel 11 and maintaining the band brake in engagement with said wheel a fish may be allowed to "run" with the line without the necessity of having a crank arm spinning, which necessarily handicaps the fisherman.

From the above description taken in connection with the accompanying drawings, it is thought that a clear and comprehensive understanding of the construction, operation and advantages of our invention may be had, and while we have shown and described our invention as embodying a specific structure, we desire that it be understood that we may make such changes in said structure as do not depart from the spirit and scope of the invention as claimed.

Having thus fully described our invention, what we claim as new and desire to secure by Letters Patent, is:—

1. A device of the class described, including a main frame, a reel revoluble therein, a driving gear carried by said main frame, a pinion associated with said reel and engaged by said driving gear, a warning device engaging said pinion, a ratchet carried by said gear, and locking means engaging said ratchet.

2. A device of the class described, including a main frame, a reel revoluble therein, a pinion carried by said reel, a gear engaging said pinion, a second gear engaging said first gear, retarding and locking means for said gear, driving means therefor, and guiding and distributing means associated with said frame.

3. A device of the character described, including a main frame, a reel revoluble in said main frame, a pinion carried by said reel, a gear carried by said frame engaging with said pinion, a crank engageable with said gear, a ratchet associated with said gear, locking means engageable with said ratchet, warning means associated with said pinion and engageable therewith, friction brake means engaging said gear, a second gear carried by said frame, said second gear engaging said first gear, an oscillatable rod associated with second said gear, and distributing means carried by the free end of said rod.

4. A device of the class described, including the combination of a frame, a reel revoluble therein, a pinion carried by said reel, a gear carried by said frame engageable with the said pinion, the gear member being provided with a ratchet toothed portion, a locking brake therefor comprising, an arm for engagement with the said ratchet toothed portion, said arm having a portion thereof extending laterally at a right angle to the said arm, the end of said extension being bent into engagement with a spring which normally maintains the arm in engagement with the ratchet wheel, the arm and extension member being pivotally mounted on a trunnion formed integral with the frame, a block formed on said frame, a crosshead slidably mounted on the block, for slidable engagement with the said arm, an extension provided on the frame, a pin member formed on the free end of said extension and integral therewith, an extension formed on the block, a spring member interposed between the extension and said block, a cam pivotally mounted on the frame member adjacent said cross head providing means for disengaging the said arm member from the ratchet wheel.

In testimony whereof, we affix our signatures hereto.

JOHN S. BRANYAN.
ALBERT M. RUNG.

Copies of this patent may be obtained for five cents each, by addressing the "Commissioner of Patents, Washington, D. C."